US012769245B2

(12) United States Patent
Nakae et al.

(10) Patent No.: US 12,769,245 B2
(45) Date of Patent: Oct. 20, 2026

(54) INTERMEDIATE TRANSFER UNIT, IMAGE FORMING APPARATUS, AND METHOD OF MANUFACTURING AN INTERMEDIATE TRANSFER UNIT

(71) Applicant: KYOCERA Document Solutions Inc., Osaka (JP)

(72) Inventors: Sadanori Nakae, Osaka (JP); Ryosuke Kimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/068,626

(22) Filed: Mar. 3, 2025

(65) Prior Publication Data

US 2025/0291298 A1 Sep. 18, 2025

(30) Foreign Application Priority Data

Mar. 14, 2024 (JP) ................................ 2024-040108

(51) Int. Cl.
*G03G 15/16* (2006.01)
*G03G 15/00* (2006.01)
*G03G 15/01* (2006.01)

(52) U.S. Cl.
CPC ......... *G03G 15/80* (2013.01); *G03G 15/0189* (2013.01); *G03G 15/1605* (2013.01); *G03G 2215/00978* (2013.01); *G03G 2215/0132* (2013.01)

(58) Field of Classification Search
CPC ........... G03G 15/1675; G03G 15/1605; G03G 15/80; G03G 15/1615
See application file for complete search history.

(56) References Cited

U.S. PATENT DOCUMENTS

2018/0032023 A1* 2/2018 Shimizu ............. G03G 15/5004
2018/0181033 A1* 6/2018 Minobe ................ G03G 15/161
2022/0197193 A1* 6/2022 Sasame .............. G03G 15/1675

FOREIGN PATENT DOCUMENTS

JP 2017-026872 A 2/2017

* cited by examiner

*Primary Examiner* — Jessica L Eley
(74) *Attorney, Agent, or Firm* — Stein IP, LLC

(57) ABSTRACT

An intermediate transfer unit includes an intermediate transfer belt, a plurality of primary transfer members, and a plurality of power supply portions that feed a transfer voltage to the corresponding primary transfer members. The power supply portions have a power supply line connected to the source of the transfer voltage and a resistor portion arranged between the corresponding primary transfer member and the power supply line. The resistor portion includes a plurality of resistive elements. The primary transfer member is connected to the power supply line via one or more previously selected resistive elements out of the plurality of resistive elements in the corresponding power supply portion.

8 Claims, 8 Drawing Sheets

INTERMEDIATE TRANSFER UNIT, IMAGE FORMING APPARATUS, AND METHOD OF MANUFACTURING AN INTERMEDIATE TRANSFER UNIT

INCORPORATION BY REFERENCE

This application is based on and claims the benefit of priority from Japanese Patent Application No. 2024-040108 filed on Mar. 14, 2024, the contents of which are hereby incorporated by reference.

BACKGROUND

The present disclosure relates to an intermediate transfer unit, an image forming apparatus, and a method of manufacturing the intermediate transfer unit.

Conventional image forming apparatuses include four image forming portions corresponding to different colors, namely cyan, magenta, yellow, and black. The image forming apparatuses include an intermediate transfer unit having an intermediate transfer belt. The image forming portions each form a toner image with toner of the corresponding color to primarily transfer it to the intermediate transfer belt. The intermediate transfer unit secondarily transfers the toner image to a sheet.

The image forming portions each has an image carrying member that carries the toner image. The intermediate transfer unit has four primary transfer members corresponding to the image carrying members. The primary transfer members each face the corresponding image carrying members across the intermediate transfer belt. The primary transfer members are fed with a transfer voltage. Thus, the toner image is primarily transferred from the image carrying members to the intermediate transfer belt.

SUMMARY

According to a first aspect of the present disclosure, an intermediate transfer unit includes an intermediate transfer belt, a plurality of primary transfer members, and a plurality of power supply portions. The intermediate transfer belt is rotatably stretched, has an outer circumferential surface to which a toner image is transferred from each of a plurality of image carrying members, and rotates while carrying the toner image. The plurality of primary transfer members are assigned one to each of the plurality of image carrying members and hold the intermediate transfer belt against the corresponding image carrying members to primarily transfer the toner image to the intermediate transfer belt. The plurality of power supply portions are assigned one to each of the plurality of primary transfer members and feed a transfer voltage to the corresponding primary transfer members. The power supply portion has a power supply line and a resistor portion. The power supply line is connected to the source of the transfer voltage. The resistor portion is arranged between the corresponding primary transfer member and the power supply line. The resistor portion includes a plurality of resistive elements having equal or different resistance values. The primary transfer member is connected to the power supply line via one or more previously selected resistive elements out of the plurality of resistive elements in the corresponding power supply portion.

According to a second aspect of the present disclosure, an image forming apparatus includes the intermediate transfer unit described above, the plurality of image carrying members, and a secondary transfer member that is in pressed contact with the outer circumferential surface of the intermediate transfer belt to form a transfer nip against the intermediate transfer belt to secondarily transfer the toner image on the intermediate transfer belt to a sheet that passes through the transfer nip.

According to a third aspect of the present disclosure, a method of manufacturing the intermediate transfer unit described above includes a step of feeding a predetermined voltage to each of the plurality of primary transfer members to measure the current values through the plurality of primary transfer members, and a step of selecting the resistive elements to be connected to the power supply line for each of the power supply portions such that the current values through the primary transfer members are each equal to a predetermined current value.

DETAILED DESCRIPTION

An image forming apparatus 100 according to an embodiment will be described below with reference to FIGS. 1 to 8. The image forming apparatus 100 performs a job to print an image on a sheet S (hereinafter, referred to simply as print job). Usually, the image forming apparatus 100 is installed on a substantially flat floor FL. The direction perpendicular to the floor FL is the up-down direction in the image forming apparatus 100.

Figure 1:
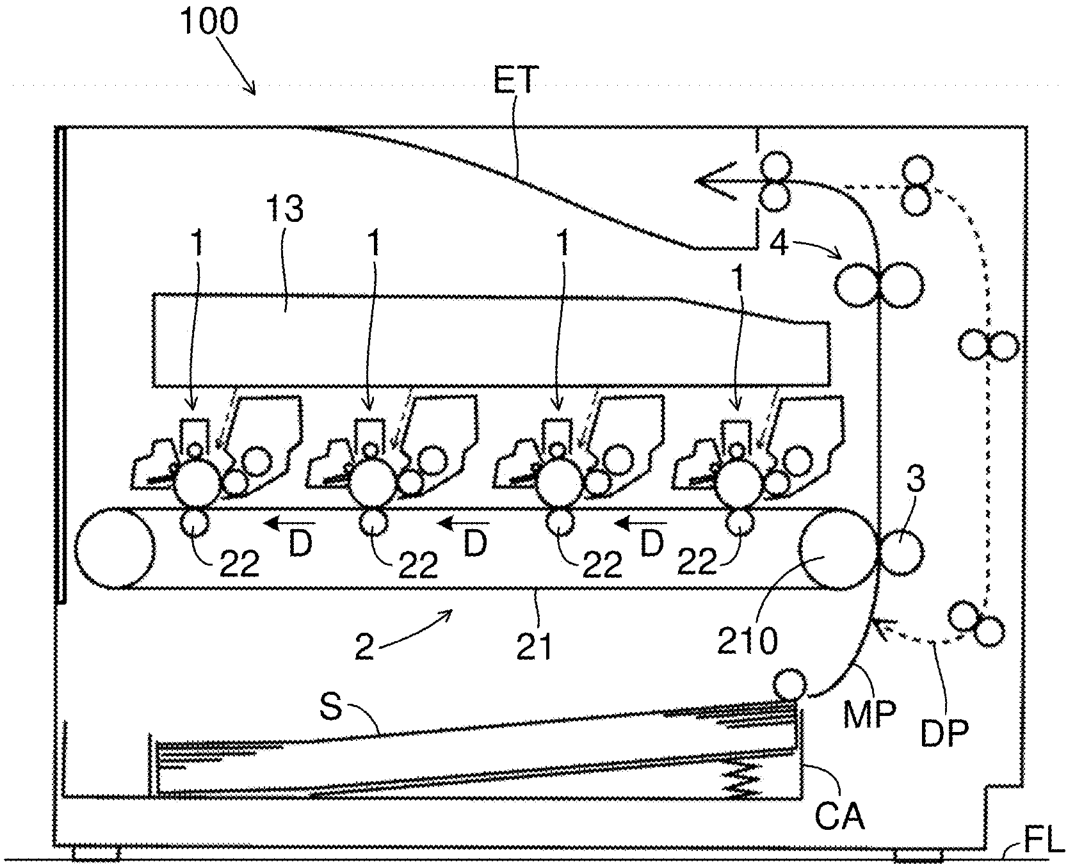
FIG. 1 is a schematic diagram of an image forming apparatus according to an embodiment.

Configuration of the Image Forming Apparatus: The image forming apparatus 100 includes a main conveyance passage MP as shown in FIG. 1. The image forming apparatus 100 includes a sheet cassette CA. The sheet cassette CA is removably mountable in the main body of the image forming apparatus 100. The sheet cassette CA stores sheets S used in a print job. The main conveyance passage MP extends from the sheet cassette CA via a transfer position and a fixing position in this order to an ejection tray ET.

In the print job, a sheet S in the sheet cassette CA is fed to the main conveyance passage MP and the sheet S is conveyed along the main conveyance passage MP. Meanwhile, an image is formed with toner. The image is printed on the sheet S being conveyed. In other words, a transfer process (specifically, secondary transfer) of transferring the image to the sheet S being conveyed is performed at the transfer position. At the fixing position, a fixing process of fixing the image to the sheet S is performed.

The image forming apparatus 100 includes four image forming portions 1 corresponding to different colors, namely cyan, magenta, yellow, and black. The image forming portions 1 each form an image (that is, toner image) with toner of the corresponding color.

In the following description, one image forming portion 1 will be taken up and its configuration will be described. The image forming portions 1 are all configured similarly. Accordingly, for the configuration of the other image forming portions 1, the description below is to be referred to and no overlapping description will be repeated.

Figure 2:
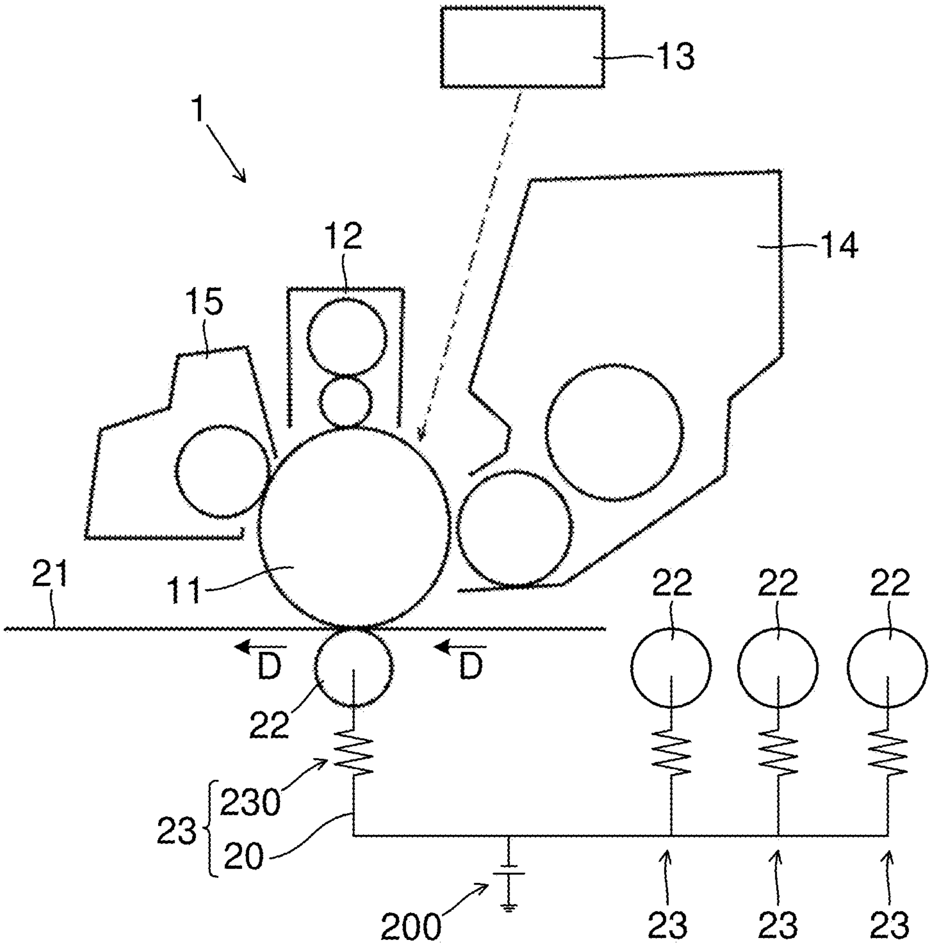
FIG. 2 is a schematic diagram of and around a primary transfer roller according to the embodiment.

As shown in FIG. 2, the image forming portion 1 includes a photosensitive drum 11, a charging device 12, an exposure device 13, a development device 14, and a cleaning device 15. The photosensitive drum 11 corresponds to an "image carrying member". For example, the photosensitive drum 11, the charging device 12, the development device 14, and the cleaning device 15 constitute a single unit. The exposure device 13 is a separate unit from that unit.

The photosensitive drum 11 is supported rotatably about an axis extending in one direction (the direction perpendicular to the plane of FIG. 2). The outer circumferential surface of the photosensitive drum 11 is the carrying surface for a toner image. The photosensitive drum 11 rotates while carrying the toner image on its outer circumferential surface.

The charging device 12 has a charging roller. The charging roller makes contact with the outer circumferential surface of the photosensitive drum 11. Thus, the charging device 12 electrostatically charges the outer circumferential surface of the photosensitive drum 11.

The exposure device 13 exposes to light the outer circumferential surface of the photosensitive drum 11 and attenuates the charge. The exposure device 13 exposes to light the outer circumferential surface of the photosensitive drum 11 to form an electrostatic latent image on the outer circumferential surface of the photosensitive drum 11.

The development device 14 stores developer containing toner. The developer is a two-component developer containing toner and carrier. The development device 14 includes a development roller. The development roller is supported rotatably about an axis extending in one direction (the direction perpendicular to the plane of FIG. 2). The development roller carries the developer (that is, toner) on its outer circumferential surface. On the outer circumferential surface of the development roller, a magnetic brush is formed. The development roller rotates while keeping the magnetic brush in contact with the outer circumferential surface of the photosensitive drum 11. Thus, the toner adheres to the outer circumferential surface of the photosensitive drum 11 to form a toner image on the outer circumferential surface of the photosensitive drum 11.

The cleaning device 15 removes the toner left on the outer circumferential surface of the photosensitive drum 11 downstream of the contact position between an intermediate transfer belt 21, which will be described later, and the photosensitive drum 11, in the rotation direction of the photosensitive drum 11. The toner that is not transferred to the intermediate transfer belt 21 remains on the outer circumferential surface of the photosensitive drum 11.

As shown in FIG. 1, the image forming apparatus 100 includes an intermediate transfer unit 2. The intermediate transfer unit 2 is arranged below each image forming portions 1. The components of the intermediate transfer unit 2 are supported on a frame, unshown, of the intermediate transfer unit 2 (hereinafter, the frame is referred as a unit frame). The unit frame is removably mountable in the main body of the image forming apparatus 100. Thus, the intermediate transfer unit 2 is removably mountable in the main body of the image forming apparatus 100.

The intermediate transfer unit 2 includes the intermediate transfer belt 21. The intermediate transfer belt 21 is an endless belt. The intermediate transfer belt 21 is stretched around a plurality of stretching rollers including a driving roller 210 (no reference signs are assigned to the other stretching rollers). Each stretching roller is supported on the unit frame and is rotatable about an axis extending in one direction (the direction perpendicular to the plane of FIG. 2).

The driving roller 210 rotates by receiving motive power from a belt motor (not shown). The intermediate transfer belt 21 rotates by following the rotation of the driving roller 210 as this rotates. That is, the intermediate transfer belt 21 is rotatably supported. Four photosensitive drums 11 are arranged above the intermediate transfer belt 21, in a row at intervals from each other along the rotation direction of the intermediate transfer belt 21.

The intermediate transfer belt 21 is arranged so that its outer circumferential surface makes contact with the outer circumferential surfaces of the photosensitive drums 11. That is, the photosensitive drums 11 are arranged at the outer circumference side of the intermediate transfer belt 21. On the outer circumferential surface of the intermediate transfer belt 21, the toner images on the photosensitive drums 11 are primary transferred. The intermediate transfer belt 21 rotates while carrying the toner images on its outer circumferential surface. Thus, the toner images on the intermediate transfer belt 21 are conveyed toward the transfer position.

The intermediate transfer unit 2 includes a primary transfer roller 22. The primary transfer roller 22 corresponds to a "primary transfer member". Four primary transfer rollers 22 are provided, of which each is assigned to one of the photosensitive drums 11. In other words, the intermediate transfer unit 2 includes four primary transfer rollers 22 assigned to different colors, namely cyan, magenta, yellow, and black.

The primary transfer rollers 22 are supported on the unit frame and are rotatable about an axis extending in one direction (the direction perpendicular to the plane of FIG. 2). The primary transfer rollers 22 are arranged at the inner circumference side of the intermediate transfer belt 21. The primary transfer rollers 22 are in pressed contact, across the intermediate transfer belt 21, with the photosensitive drums 11 that carry the toner images of the corresponding colors. The primary transfer rollers 22 are fed with a transfer voltage. The transfer voltage is a voltage with the polarity opposite to the polarity of the toner.

As shown in FIG. 2, the intermediate transfer unit 2 includes a power supply portion 23. Four power supply portions 23 are provided, of which each is assigned to one of the primary transfer rollers 22. The power supply portions 23 are connected to a transfer voltage power supply 200. The transfer voltage power supply 200 is a source of the transfer voltage to the primary transfer rollers 22. Each power supply portion 23 feeds the transfer voltage to the corresponding primary transfer roller 22. For convenience' sake, in FIG. 2, only the image forming portion 1 corresponding to one primary transfer roller 22 is shown and the image forming portions 1 corresponding to the other primary transfer rollers 22 are omitted from illustration.

Each power supply portion 23 has a power supply line 20. The unit frame is provided with a unit-side contact. The power supply lines 20 of the power supply portions 23 are connected to the unit-side contact. The power supply lines 20 of the power supply portions 23 extend by branching at the unit-side contact.

On the other hand, the main body of the image forming apparatus 100 is provided with a main body-side contact. The transfer voltage power supply 200 is connected to the main body-side contact. The main body-side contact is arranged at a position at which it can make contact with the unit-side contact when the intermediate transfer unit 2 is mounted in the main body of the image forming apparatus 100.

With this configuration, when the intermediate transfer unit 2 is mounted in the image forming apparatus 100, the unit-side contact makes contact with the main body-side contact. That is, the power supply portions 23 are connected to the transfer voltage power supply 200. Thus, even though the intermediate transfer unit 2 is removably mountable in the main body of the image forming apparatus 100, it is possible to feed the transfer voltage to the primary transfer rollers 22 by mounting the intermediate transfer unit 2 into the main body of the image forming apparatus 100.

Here, each power supply portion 23 has a resistor portion 230. The resistor portions 230 in the power supply portions 23 are arranged between the corresponding primary transfer rollers 22 and the power supply line 20. The resistor portions 230 in the power supply portions 23 are arranged on the current paths between the corresponding primary transfer rollers 22 and the unit-side contact. In other words, the power supply lines 20 of the power supply portions 23 are connected to the corresponding primary transfer rollers 22 via the resistor portions 230.

As shown in FIG. 1, the image forming apparatus 100 includes a secondary transfer roller 3. The secondary transfer roller 3 corresponds to a "secondary transfer member". The secondary transfer roller 3 is in pressed contact with the outer circumferential surface of the intermediate transfer belt 21 at the transfer position. The secondary transfer roller 3 holds the intermediate transfer belt 21 against the driving roller 210 to form a transfer nip from the intermediate transfer belt 21. Thus, the transfer nip is formed at the transfer position. The main conveyance passage MP passes through the transfer nip.

In the print job, the sheet S is conveyed toward the transfer position (that is, the transfer nip). The sheet S being conveyed passes through the transfer nip. The intermediate transfer belt 21 brings its outer circumferential surface into contact with the sheet S downstream of the contact position with the photosensitive drum 11 in the rotation direction of the belt.

The image forming portions 1 form the toner images with toner of the corresponding colors. The primary transfer rollers 22 primarily transfer the toner images to the outer circumferential surface of the intermediate transfer belt 21. The intermediate transfer belt 21 rotates while carrying the toner images. That is, the intermediate transfer belt 21 conveys the toner images toward the transfer position. The direction of arrow D in the figures is the conveyance direction of the toner image. The secondary transfer roller 3 secondarily transfers the toner images to the sheet S as it passes through the transfer nip.

In color printing, the toner images are formed in all the image forming portions 1. The four image forming portions 1 form the toner images in order starting with the image forming portion 1 of which the contact position between the photosensitive drum 11 and the intermediate transfer belt 21 is most upstream in the belt rotation direction so that the toner images are primarily transferred to the intermediate transfer belt 21. Meanwhile, the toner images of different colors are overlaid on each other on the intermediate transfer belt 21. Thus, a full color toner image is formed on the intermediate transfer belt 21. To the sheet S, the full color toner image is secondarily transferred.

The image forming apparatus 100 includes a fixing portion 4. The fixing portion 4 includes a heating roller and a pressing roller. The heating roller incorporates a heater. The pressing roller is in pressed contact with the heating roller. The heating and pressing rollers are in pressed contact with each other to form a fixing nip at the fixing position.

In the print job, the sheet S passes through the fixing position. That is, the sheet S is held in the fixing nip. The fixing portion 4 heats the sheet S as it passes across the fixing position. At the fixing position, the sheet S is pressed. The fixing portion 4 heats and presses the sheet S to fix the toner image to the sheet S. The sheet S after fixing is ejected to the ejection tray ET.

The image forming apparatus 100 includes a conveyance portion, to which no reference sign is assigned. The conveyance portion includes a pair of conveyance rollers. The pair of conveyance rollers has a conveyance nip between the rollers. The pair of conveyance rollers rotates to convey the sheet S having entered the conveyance nip. The conveyance portion conveys the sheet S along the main conveyance passage MP. The conveyance portion conveys the sheet S also along a duplex print conveyance passage DP, which will be described later.

The image forming apparatus 100 can perform a simplex print job that print images on only one-side of the sheet S, and also in addition, can perform a duplex print job that print images on both sides of the sheet S. To perform the duplex print job, the image forming apparatus 100 includes the duplex print conveyance passage DP.

The duplex print conveyance passage DP branches off the main conveyance passage MP at a branching position downstream, with respect to the sheet conveyance direction, of the fixing position in the main conveyance passage MP. The duplex print conveyance passage DP joins the main conveyance passage MP at a joining position upstream, with respect to the sheet conveyance direction, of the transfer position in the main conveyance passage MP.

If the performed job is a simplex print job, the sheet S passes through the transfer nip only once and the transfer process is performed once on the sheet S as it passes through the transfer nip. After the first-time transfer process, the sheet S is ejected as it is to the ejection tray ET.

If the performed job is a duplex print job, the transfer process has to be performed once for each of the front and back sides of the sheet S and so the sheet S passes through the transfer nip twice. Specifically, when the sheet S passes through the transfer nip for the first time, the transfer process is performed on one side of the sheet S. After the first-time transfer process, after the trailing end of the sheet S has passed across the branching position, before the sheet S is completely ejected to the ejection tray ET, the sheet S is switched back. Thus, the sheet S is pulled in from its trailing end into the duplex print conveyance passage DP.

After that, the sheet S is conveyed along the duplex print conveyance passage DP. Then the sheet S in the duplex print conveyance passage DP is returned to the main conveyance passage MP at the joining position. The sheet S returned to the main conveyance passage MP is conveyed along the main conveyance passage MP and again passes through the transfer nip. Here, the front and back sides of the sheet S have been reversed top side down compared with when it passed through the transfer nip the last time. Thus, when the sheet S passes through the transfer nip for the second time, the transfer process is performed to the other side, opposite to the one side, of the sheet S.

Figure 3:
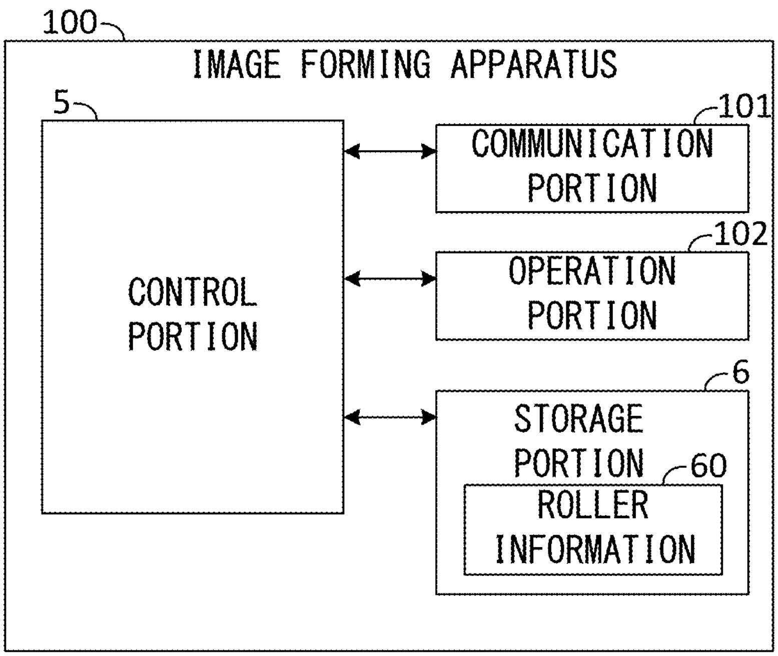
FIG. 3 is a block diagram of the image forming apparatus according to the embodiment.

As shown in FIG. 3, the image forming apparatus 100 includes a control portion 5. The control portion 5 includes processing circuits such as a CPU and an ASIC. The control portion 5 includes memory devices such as a ROM and a RAM. The control portion 5 controls the print job performed in the image forming apparatus 100. The control portion 5 controls image formation with toner and primary and secondary transfer of toner images.

The image forming apparatus 100 includes a communication portion 101. The communication portion 101 includes a communication circuit, a communication memory, and a communication connector. The communication portion 101 is connected to an external device via a network such as a LAN so that communication is possible between them. The external device can be a user terminal. The user terminal can be a personal computer (PC), smartphone, or tablet computer.

The control portion 5 communicates with the external device using the communication portion 101. For example, print data for the print job is transmitted from the external device (user terminal) to the image forming apparatus 100. The print data includes image data to be printed in the print job.

The control portion 5 adds the print job corresponding to the received print data to a queue. The control portion 5 performs the print jobs in the queue in order of their receipt. If the queue includes a plurality of print jobs, the plurality of print jobs are sequentially performed.

The image forming apparatus 100 includes a operation portion 102. The operation portion 102 is a control panel and includes a touch screen. The operation portion 102 receives settings and instructions from the user. The operation portion 102 is connected to the control portion 5. The control portion 5 detects the settings and instructions that the operation portion 102 receives from the user.

The image forming apparatus 100 includes a storage portion 6. Any storage device such as a flash memory, a HDD, and an SSD can be used as the storage portion 6. The storage portion 6 is connected to the control portion 5. The control portion 5 writes data to and reads data from the storage portion 6.

Voltage Feeding to Primary Transfer Roller: The primary transfer rollers 22 are fed with the transfer voltage via a power supply portion 23 having one of the configurations shown in FIGS. 4 to 6. This will now be described specifically.

The power supply portion 23 has a plurality of resistive elements R as a resistor portion 230. That is, the resistor portion 230 includes a plurality of resistive elements R. This feature is common to all the power supply portions 23. For example, the power supply portion 23 has three resistive elements R. The plurality of resistive elements R in the resistor portion 230 can have equal or different resistance values. The resistor portion 230 can include any number, two or more, of resistive elements R and the number can be two, or four or more.

In this embodiment, the power supply line 20 of the power supply portion 23 is connected only to one or more previously selected resistive elements R out of the plurality of resistive elements R in the corresponding power supply portion 23 and is not connected to the unselected resistive elements R. In other words, the primary transfer roller 22 is connected to the power supply line 20 of the corresponding power supply portion 23 via one or more previously selected resistive elements R out of the plurality of resistive elements R in the corresponding power supply portion 23.

Figure 4:
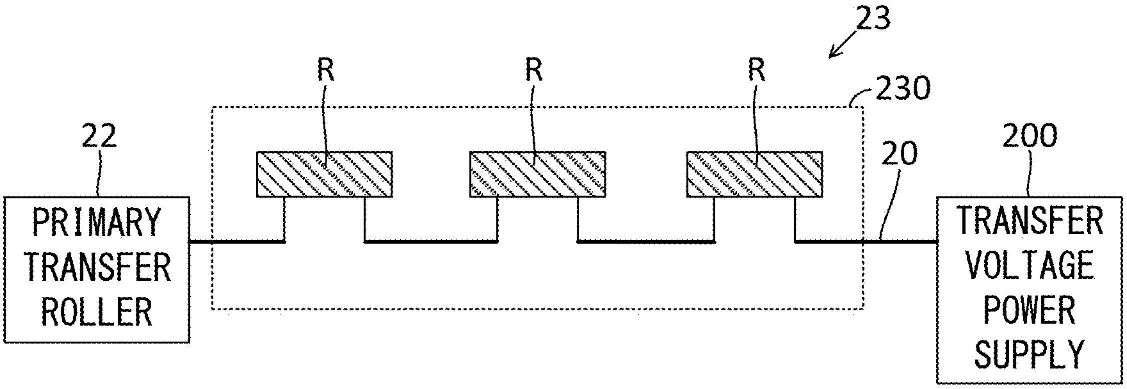
FIG. 4 is a schematic diagram showing the configuration of a resistor portion according to the embodiment (with three resistive elements selected).
Figure 5:
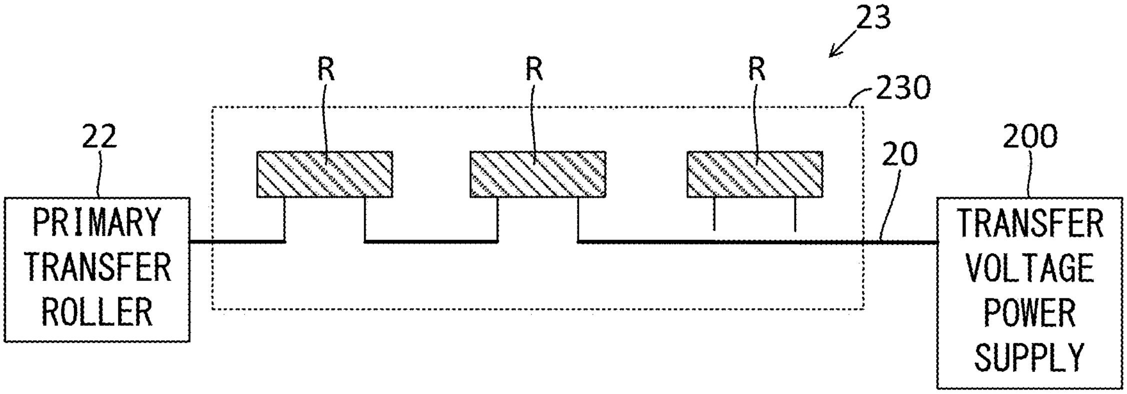
FIG. 5 is a schematic diagram showing the configuration of the resistor portion according to the embodiment (with two resistive elements selected).
Figure 6:
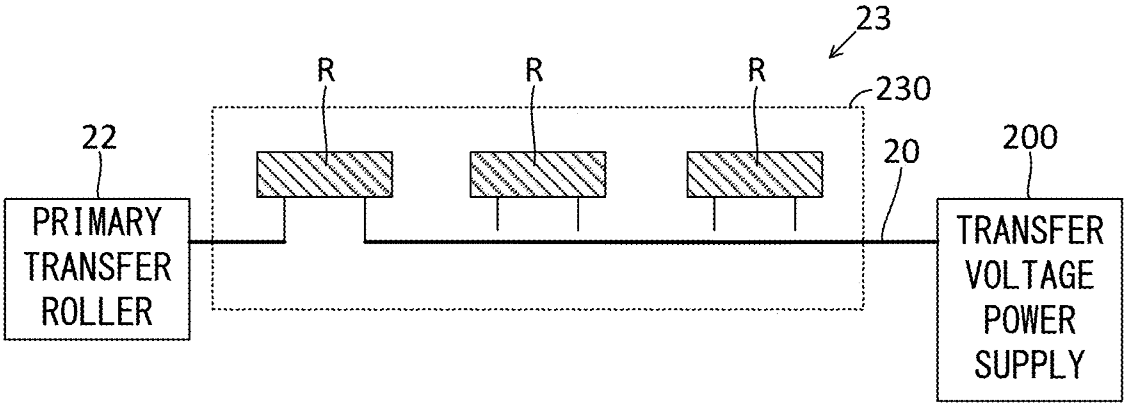
FIG. 6 is a schematic diagram showing the configuration of the resistor portion according to the embodiment (with one resistive element selected).

In the example shown in FIG. 4, three (i.e., all) resistive elements R are selected. In the example shown in FIG. 5, two resistive elements R are selected. In the example shown in FIG. 6, one resistive element R is selected.

The power supply portion 23 with the configuration shown in FIG. 4 connects together the corresponding primary transfer roller 22 and the power supply line 20 via all the three resistive elements R. The power supply portion 23 with the configuration shown in FIG. 5 connects together the corresponding primary transfer roller 22 and the power supply line 20 via two resistive elements R. The power supply portion 23 shown in FIG. 6 connects together the corresponding primary transfer roller 22 and the power supply line 20 via one resistive element R.

With this configuration, the current value through each primary transfer roller 22 can be adjusted individually. The process of adjusting the current value only involves changing the connection of the resistive elements R for each primary transfer rollers 22. This makes it easy to set all the current values through the primary transfer rollers 22 to the target value. In other words, it is then possible to prevent the current values through the primary transfer rollers 22 to deviate from the target value. This prevents image quality degradation caused by the current values through the primary transfer rollers 22 deviating significantly from the target value.

In this embodiment, the manufacturing process of the intermediate transfer unit 2 involves, as one of its steps, a step of adjusting the current values through the primary transfer rollers 22. After the intermediate transfer unit 2 is assembled, the current values flowing through the primary transfer rollers 22 are adjusted.

Figure 7:
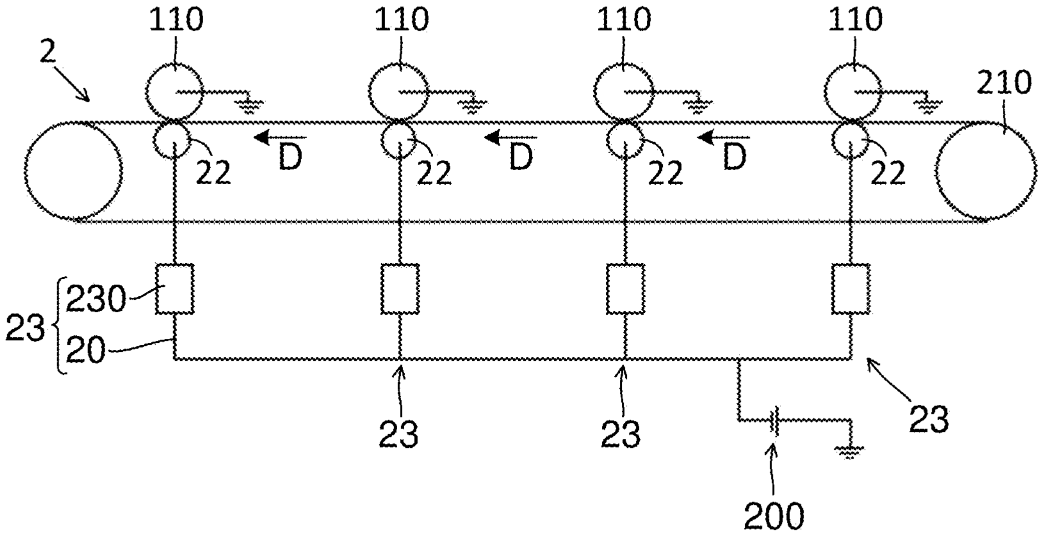
FIG. 7 is a diagram illustrating a method of measuring a current value through the primary transfer roller according to the embodiment.

In the step of adjusting the current values through the primary transfer rollers 22, as shown in FIG. 7, grounded roller members 110 are prepared and the intermediate transfer unit 2 is held so that the primary transfer rollers 22 face the roller members 110 across the intermediate transfer belt 21. Then, the intermediate transfer belt 21 is rotated while the primary transfer rollers 22 are fed with a predetermined voltage and the current values through the primary transfer rollers 22 are measured.

Next, based on the current values through the primary transfer rollers 22, the connection of the resistive elements R in the power supply portions 23 is determined. Meanwhile, the resistive elements R to be connected to the power supply line 20 are selected for each of the power supply portions 23 such that the current values through the primary transfer rollers 22 are equal to a predetermined current value (i.e., the target value). Then, to the primary transfer rollers 22, the power supply lines 20 are connected via the one or more resistive elements R selected in this step. This makes it easy to set the current values through the primary transfer rollers 22 to the target value.

Figure 8:
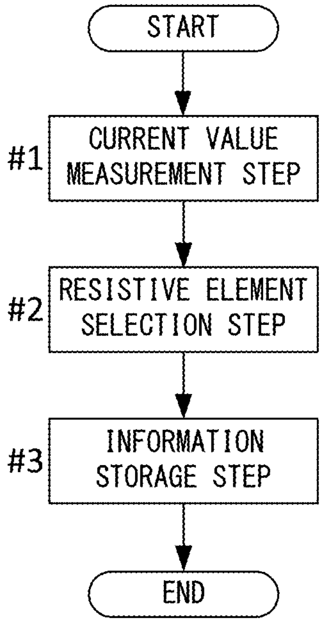
FIG. 8 is a diagram showing the procedure of a manufacturing process of an intermediate transfer unit according to the embodiment.

As shown in FIG. 8, the manufacturing process of the intermediate transfer unit 2 (adjustment of the current values through the primary transfer rollers 22) includes a current value measurement step #1 and a resistive element selection step #2. The current value measurement step #1 is a step of feeding a predetermined voltage to the primary transfer rollers 22 to measure the current values through the primary transfer rollers 22. The resistive element selection step #2 is a step of selecting the resistive elements R to be connected to the power supply lines 20 for the power supply portions 23 such that the current values through the primary transfer rollers 22 are equal to a predetermined current value.

For example, the resistance value of each primary transfer roller 22 (when fed with 1000 V) is 500 kΩ or more. In the power supply portions 23, the resistive elements R to be connected to the power supply line 20 are selected so that their resistance value is equal to or larger than 10 times the tolerated upper limit value of the resistance value of the primary transfer roller 22. That is, the resistance value of each resistor portion 230 in the power supply portions 23 is higher than the resistance value of the corresponding primary transfer roller 22.

In this embodiment, the resistor portion 230 in each power supply portion 23 includes at least one resistive element R with a resistance value of 100 MΩ or more. This allows efficient adjustment of the current values through the primary transfer rollers 22. For example, of the three resistive elements R for a power supply portion 23, one may have 100 MΩ or more and the other may have less than 100 MΩ. Or, the three resistive elements R in a power supply portion 23 may all have the same resistance value.

In this embodiment, the resistive elements R to be connected to the power supply line 20 are selected such that, with respect to the conveyance direction of the toner image carried and conveyed by the intermediate transfer belt 21 (which direction is hereinafter referred to simply as the image conveyance direction), a resistor portion 230 connected to a more downstream primary transfer rollers 22 has a lower resistance value. In other words, the resistive elements R to be connected to the power supply line 20 are selected such that the resistance value of a resistor portion 230 connected to a downstream primary transfer rollers 22 is equal to or smaller than the resistance value of a resistor portion 230 connected to an upstream primary transfer rollers 22. For example, a resistor portion 230 connected to a more downstream primary transfer rollers 22 has a smaller number of resistive elements R to be connected to the power supply line 20.

For example, if, in order from upstream to downstream along the image conveyance direction (the direction of arrow D in the figures), the resistance value of the resistor portion 230 connected to the first primary transfer rollers 22 is R1, the resistance value of the resistor portion 230 connected to the second primary transfer rollers 22 is R2, the resistance value of the resistor portion 230 connected to the third primary transfer rollers 22 is R3, and the resistance value of the resistor portion 230 connected to the fourth primary transfer rollers 22 is R4, then formula (1) below is satisfied.

$$R1 \geq R2 \geq R3 \geq R4 \quad (1)$$

A configuration that satisfies formula (1) above results in a larger current through the most downstream primary transfer roller 22 in the image conveyance direction. Here, at the downstream end in the image conveyance direction, it is preferable to increase the current value through the primary transfer roller 22 to primarily transfer a toner image on top of a primarily transferred toner image. Thus, a configuration that satisfies formula (1) above is preferable. This leads to improved image quality.

In this embodiment, the unselected resistive elements R out of the plurality of resistive elements R in the power supply portions 23 are held unconnected to the power supply lines 20. This makes it easy to connect only the selected resistive elements R to the power supply lines 20.

In this embodiment, roller information 60 which represents the result of applying a predetermined voltage to the primary transfer rollers 22 and measuring the current value is stored in the storage portion 6 (see FIG. 3). That is, as shown in FIG. 8, the manufacturing process of the intermediate transfer unit 2 further includes an information storage step #3. The information storage step #3 is a step of storing to the storage portion 6 the roller information 60 representing the current values through the respective primary transfer rollers 22 and the predetermined voltage. For example, based on the roller information 60 stored in the storage portion 6, it is possible to control the image formation by the image forming portions 1. The roller information 60 corresponds to "information".

It should be understood that the above-described embodiments are in every aspect illustrative and not restrictive. The technical scope of the present disclosure is defined not by the description of the embodiments given above but by the appended claims, and encompasses any modifications made without departure from the scope and sense equivalent to those claims.

What is claimed is:

1. An intermediate transfer unit comprising:

an intermediate transfer belt rotatably stretched, the intermediate transfer belt having an outer circumferential surface to which a toner image is transferred from each of a plurality of image carrying members, the intermediate transfer belt rotating while carrying the toner image;

a plurality of primary transfer members assigned one to each of the plurality of image carrying members, the primary transfer members holding the intermediate transfer belt against the corresponding image carrying members to primarily transfer the toner image to the intermediate transfer belt;

a plurality of power supply portions assigned one to each of the plurality of primary transfer members, the power supply portions feeding a transfer voltage to the corresponding primary transfer members;

wherein the power supply portions each have a power supply line connected to a source of the transfer voltage, and a resistor portion arranged between the corresponding primary transfer member and the power supply line, the resistor portion includes a plurality of resistive elements having equal or different resistance values, and the primary transfer members are each connected to the power supply line via one or more previously selected resistive elements out of the plurality of resistive elements in the corresponding power supply portion, the primary transfer members comprise four primary transfer members, and if, in order from upstream to downstream along the conveyance direction of the toner image carried and conveyed by the intermediate transfer belt, the resistance value of the resistor portion connected to a first primary transfer members is R1, the resistance value of the resistor portion connected to a second primary transfer members is R2, the resistance value of the resistor portion connected to a third primary transfer members is R3, and the resistance value of the resistor portion connected to a fourth primary transfer members is R4, then $R1 \geq R2 \geq R3 \geq R4$ is satisfied.

2. The intermediate transfer unit according to claim 1, wherein the resistor portion includes at least one resistive element with a resistance value of 100 MΩ or more.

3. The intermediate transfer unit according to claim 1, wherein the resistive elements to be connected to the power supply line are selected such that, with respect to a conveyance direction of the toner image carried and conveyed by the intermediate transfer belt, the resistance value of a resistor portion connected to a downstream primary transfer members is equal to or smaller than the resistance value of a resistor portion connected to an upstream primary transfer members.

4. The intermediate transfer unit according to claim 1, wherein sums of the selected resistive elements in the resistor portions are higher than the resistance value of the primary transfer member.

5. The intermediate transfer unit according to claim 1, wherein unselected resistive elements in the resistor portions are held unconnected to the power supply lines.

6. An image forming apparatus comprising:

the intermediate transfer unit according to claim 1, the plurality of image carrying members, and a secondary transfer member in pressed contact with the outer circumferential surface of the intermediate transfer belt to form a transfer nip against the intermediate transfer belt, the secondary transfer member secondarily transferring the toner image on the intermediate transfer belt to a sheet that passes through the transfer nip.

7. A method of manufacturing the intermediate transfer unit according to claim 1, comprising:

a step of feeding a predetermined voltage to each of the plurality of primary transfer members to measure current values through the plurality of primary transfer members, and a step of selecting the resistive elements to be connected to the power supply line for each of the power supply portions such that the current values through the primary transfer members are each equal to a predetermined current value.

8. The method according to claim 7, further comprising:

a step of storing in a storage portion information representing the current values through the plurality of respective primary transfer members and the predetermined voltage.

* * * * *